United States Patent [19]
Langford

[11] 3,982,752
[45] Sept. 28, 1976

[54] DOCUMENT GUIDE
[75] Inventor: Forrest L. Langford, Northridge, Calif.
[73] Assignee: Terminal Data Corporation, Woodland Hills, Calif.
[22] Filed: Dec. 12, 1975
[21] Appl. No.: 640,320

[52] U.S. Cl. .............................. 271/248; 271/264
[51] Int. Cl.² ............................................. B65H 9/16
[58] Field of Search ........... 271/248, 251, 226, 264, 271/272, 273, 274

[56] References Cited
UNITED STATES PATENTS
2,995,364   8/1961   Frederick ........................ 271/251
3,107,090   10/1963   Templeton ....................... 271/251

Primary Examiner—Richard A. Schacher
Attorney, Agent, or Firm—Harry R. Lubcke

[57] ABSTRACT

A partially removable guide to direct moving documents. Such removability allows rumpled documents and foreign matter to be cleared from the guide structure. The guide is resiliently loaded to normally assume an accurate guiding position, but to be partially and temporarily removable upon manual application of force to both translate and rotate it away from that position.

9 Claims, 3 Drawing Figures

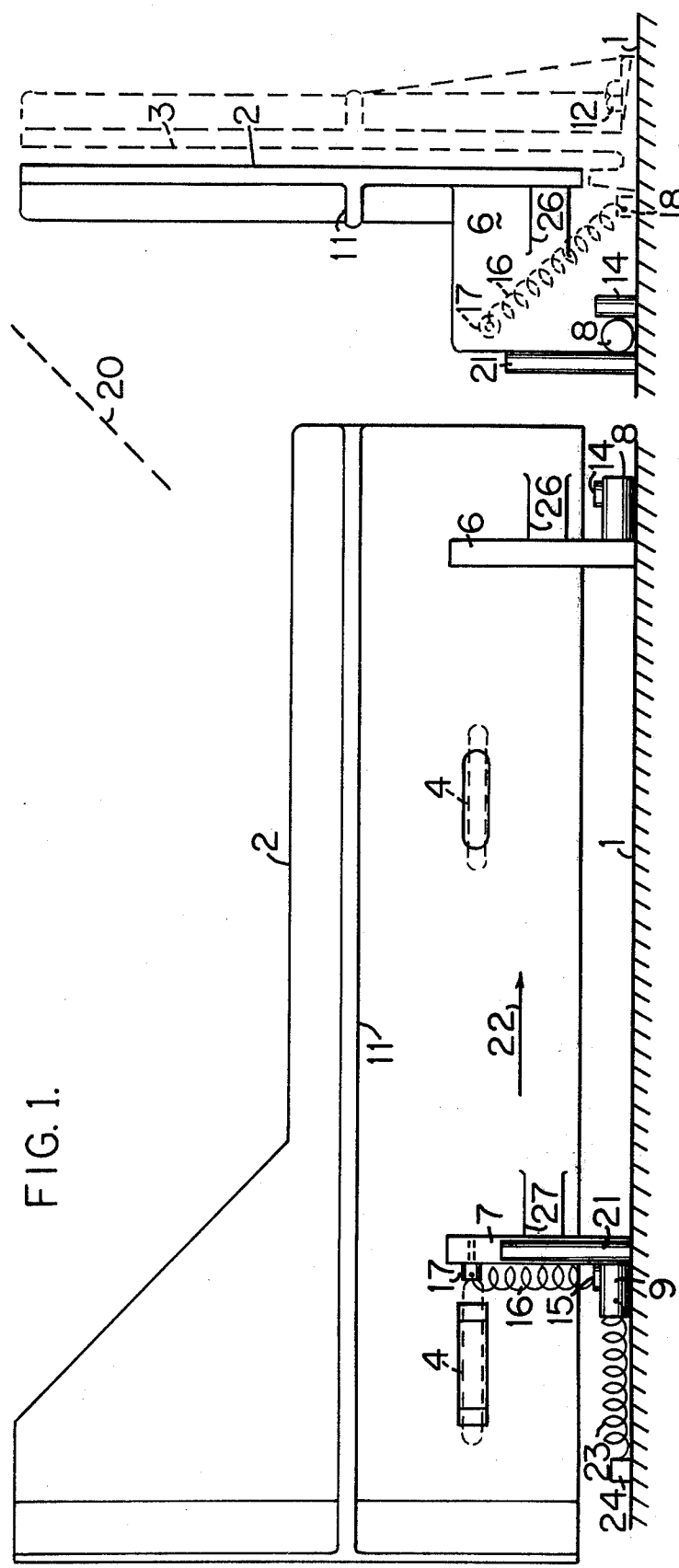
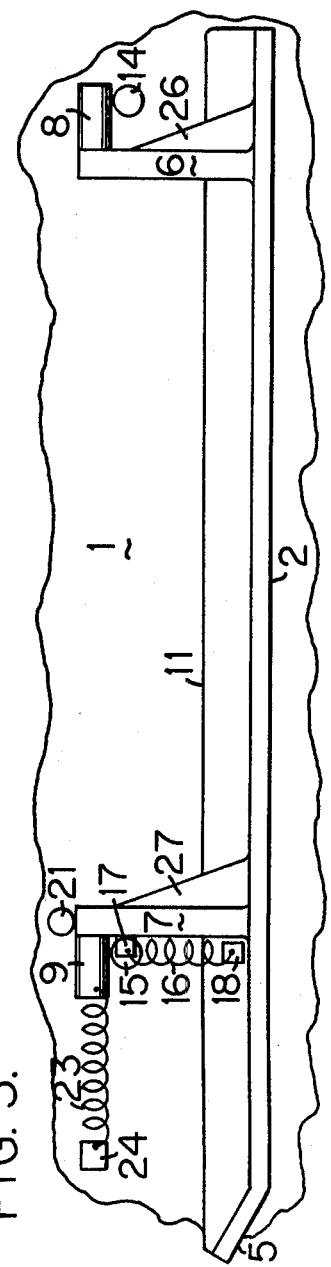
FIG. 1.
FIG. 2.
FIG. 3.

DOCUMENT GUIDE

BACKGROUND OF THE INVENTION

This invention pertains to guiding documents along a chute for processing them, as to photograph them.

A prior art arrangement has employed two elongated glass guides that are wholly removable as a unit to overcome an operating situation where "—the operator forgot to replace both plates."

Another arrangement has guideways and a mechanically adjustable guide bar for changing the path of a document through the guideways, but no means for opening the guideways, as characterized by the present invention.

A copyboard-camera assembly has widely spaced guides and associated latch means for retaining the copyboard in a horizontal or a vertical position.

BRIEF SUMMARY OF THE INVENTION

The partially removable guide is held at a normal ("home") position by a combination of stops and resilient means. One or more "feet" are a part of the movable support structure that carries the guiding surface.

One pin attached to the base of the whole guideway allows rotation of the guide surface back away from the guiding position. A second pin, similarly attached, requires translation of the support along the direction of the path of the guideway before rotation of the guide can be accomplished. This structure allows the guide to automatically avoid other fixed members of the whole device that must be positioned so closely adjacent to the guide path that rotation of the support and guide surface would not be otherwise possible.

BRIEF DESCRIPTION OF THE FIGURES

FIG. 1 is a side elevation of the removable guide.

FIG. 2 is an end elevation view of the same, with a companion stationary guide shown dotted.

FIG. 3 is a plan view of the removable guide.

DESCRIPTION OF THE PREFERRED EMBODIMENT

In the figures, numeral 1 indicates a base, typically a planar base of the whole chute structure. A smooth and unobstructed surface 2 of the guide structure actually performs the guiding function. The structure is completed by stationary guide surface 3, thus providing a narrow guide path between surfaces 2 and 3. These surfaces are typically continued by other similar colinear guide elements, which have not been shown.

The documents, such as checks and gasoline purchase slips, may be propelled down the chute by pairs of resiliently tired rollers. One of each of two pairs is shown dotted at 4 in FIG. 1. Surface 2 may be flared at 5, away from the strictly narrow path, as is shown at the left in FIG. 3. A document exposing slit may be located adjacent to the flared portion of the guide structure for exposure of the documents in a flow camera.

Support 6 is typically formed integral with the material of surface 2 and extends therefrom at right angles or at some angle approaching a right angle. A second support 7 is preferably also provided, spaced from support 6.

Foot member 8 (and 9) is typically formed integrally with support 6 (and 7). Die cast metal, or an equivalent plastic, are suitable materials for fabricating the structure.

Reinforcing rib 11 may be formed in the rear of the surface portion for usual reasons of structural rigidity.

The structure of surface 3 is roughly equivalent to that of surface 2, save that support 6 is omitted and the bottom surface of surface 3 is fastened to base 1, as by cap screw 12 that is threaded into the base.

Significant to the invention is first member 14. This may be a pin, threaded or forced into base 1 so as to be tangent to foot 8. Typically, a duplicate first member 15 is similarly positioned with respect to foot 9. This gives longitudinal stability to the guide shown. For a shorter guide, a longer foot and a rectangular guide would also afford a stable structure.

Coactive with the above first member-foot structure is first resilient means 16. This is typically a coiled tension spring, having perhaps a dozen convolutions of 1 mm diameter spring wire and exerting a force of the order of 200 grams when it is in the extended position shown. It is fastened to the upper corner of support 7 that is away from surface 2 by means of a pin or threaded fastening 17. The other end of the spring is fastened to projection 18 of base 1 at a point adjacent to surface 2, such that the spring lies essentially along a surface of support 7, as shown in FIG. 1.

The relationship between spring 16 and feet 8 & 9 is an over-center one, such that the lower surfaces of supports 6 & 7 are firmly forced upon the upper surface of base 1, and at a specified position determined by pins 14 & 15. This accurately determines the home position for surface 2.

The recited structure makes it possible to tilt surface 2 away from surface 3 and thus allow removal of any disfunction material from the slot between surfaces 2 and 3.

In a particular application, an additional element 20, such as a mirror that is shown dotted in FIG. 2, must be located with respect to the structure of surface 2 such that the possibility of tilting surface 2 away from surface 3 is seriously impaired. The mirror may compose part of the optical system for photographing the documents that pass through the guide path and so must occupy a particular position.

It is usual that elements such as 20 are limited in longitudinal extent. Thus, longitudinal translation of the structure of surface 2 by an amount of the order of one centimeter allows surface 2 to swing free of element 20.

Accordingly, second member 21 is fastened to base 1 closely adjacent to support 7, and it has a significant height with respect to the height of support 7. This prevents the support and surface assembly from being tilted until the assembly is translated in the direction of arrow 22 a sufficient distance to avoid second member 21.

Second member 21 is shown as a cylindrical pin. It may; however, have an elongated dimension in the direction indicated by arrow 22, so that a greater translation of support 7 is required until the same is clear of the second member. In such an instance feet 8 & 9 are made longer and first member 14 is placed farther to the right in FIGS. 1 and 3.

Second resilient means 23 is attached to the moveable structure, say at the end of foot 9 and also to base 1 at projection 24, which is in the direction opposite to that indicated by arrow 22.

The guide is shown in its translational "home" position in FIGS. 1 and 3, this being with support 7 touching the duplicate first member, pin 15. This relation is retained by purposely providing residual force in spring 23. This spring may have the same properties as spring 16.

When the guide structure is manually translated in the direction of arrow 22, spring 23 extends and also spring 16 is slightly and at an angle. As soon as support 7 clears second member 21 the guide may be tilted open. When a malfunction of a document in the chute has been cured it is not necessary to manually place surface 2 in the home position again. This is automatically accomplished by springs 16 and 23 and first members 14 and 15. One can just let go of the guide.

It is usual to have stiffening ribs 26 and 27 formed in the die casting, thereby bonding supports 6 & 7, respectively, to the rear of surface 2.

Of the pairs of resiliently tired rollers 4, the ones indicated dotted at the left in FIG. 1 may be of the "hard" drive type for accurately translating documents for photographing adjacent to flared portion 5. The rollers at the right may be of the "soft" drive type, merely forwarding the documents with nominal accuracy.

Appropriate bosses may be molded into the side of surface 2 away from the document path to retain shafts and drive means for the rollers.

The first and second resilient means 16 and 23 are necessarily orthogonally related (at right angles), or nearly so.

Elements 7, 15, 16, 21 and 23 are properly grouped together if guide surface 2 is short and only one support assembly is provided. However, for the two-support assembly shown in the FIGS., 6 and 7, resilient element 23 may be attached to support 6, and second member 21 may be positioned adjacent to support 6 instead of adjacent to support 7 as shown. Further similar options are open as to the grouping of the elements.

It will be recognized that restoring translational force can be provided by a compression or leaf spring bearing upon foot 8, rather than spring 23, note as shown. Also, the tilting restoring force can be provided by a leaf spring pressing upon the rear of surface 2 to maintain the same upright.

I claim:
1. A document guide, comprising:
   a. a plate (2) forming a surface of a guide for the transport of documents,
   b. a support (7) attached to said plate and extending away from the surface of said plate,
   c. a foot member (9) upon said support,
   d. a base (1),
   e. a first member (15) upon said base to allow rotation of said foot member, support, and plate with respect to said base,
   f. first resilient means (16) attached to said support and to said base to urge a fixed rotational relation between said plate and said base, and
   g. second resilient means (23) orthogonally attached to said support and to said base to urge a fixed translational relation between said plate and said base.
2. The document guide of claim 1, which additionally includes;
   a. a second member (21) upon said base positioned to inhibit rotation of said foot member, support, and plate, until the same have been translated sufficiently to allow said support to avoid said second member.
3. The guide of claim 1, in which;
   a. said foot member is comprised of a cylindrical boss attached to said support (7) away from said surface.
4. The guide of claim 1, in which;
   a. said first member (15) is an upstanding projection from said base against which said foot (9) rests.
5. The guide of claim 1, in which;
   a. said first resilient means (16) is a spring mounted in an over-center relation between said support (7) and said foot member (9).
6. The guide of claim 5, in which;
   a. said spring (16) is a coiled wire tension-exerting spring.
7. The guide of claim 1, in which;
   a. said second resilient means (23) is a tension-exerting spring.
8. The guide of claim 1, in which;
   a. said second member (21) is an upstanding projection from said base positioned close to said support (7).
9. The guide of claim 1, in which;
   a. plural supports (6,7), plural feet (8,9), and plural first members (14,15) are located in spaced groups.

* * * * *